US008977059B2

(12) United States Patent
Bellegarda et al.

(10) Patent No.: US 8,977,059 B2
(45) Date of Patent: Mar. 10, 2015

(54) INTEGRATING FEATURE EXTRACTION VIA LOCAL SEQUENTIAL EMBEDDING FOR AUTOMATIC HANDWRITING RECOGNITION

(75) Inventors: Jerome R. Bellegarda, Saratoga, CA (US); Jannes G. A. Dolfing, Sunnyvale, CA (US); Devang K. Naik, San Jose, CA (US)

(73) Assignee: Apple Inc., Cupertino, CA (US)

( * ) Notice: Subject to any disclaimer, the term of this patent is extended or adjusted under 35 U.S.C. 154(b) by 122 days.

(21) Appl. No.: 13/507,119

(22) Filed: Jun. 4, 2012

(65) Prior Publication Data

US 2012/0308143 A1    Dec. 6, 2012

Related U.S. Application Data

(60) Provisional application No. 61/493,343, filed on Jun. 3, 2011.

(51) Int. Cl.
*G06K 9/48* (2006.01)
*G06K 9/00* (2006.01)

(52) U.S. Cl.
CPC .............. *G06K 9/00416* (2013.01); *G06K 9/48* (2013.01)
USPC ........... 382/197; 382/154; 382/187; 382/202; 382/228; 382/301

(58) Field of Classification Search
USPC ......... 382/154, 187, 197, 202, 228, 188, 195, 382/301
See application file for complete search history.

(56) References Cited

U.S. PATENT DOCUMENTS

| | | | | |
|---|---|---|---|---|
| 4,680,805 A * | 7/1987 | Scott | ............................ | 382/197 |
| 4,975,975 A * | 12/1990 | Filipski | ........................ | 382/227 |
| 5,007,098 A * | 4/1991 | Kumagai | ...................... | 382/185 |
| 5,491,758 A * | 2/1996 | Bellegarda et al. | .......... | 382/187 |
| 5,544,264 A * | 8/1996 | Bellegarda et al. | .......... | 382/188 |
| 5,734,750 A * | 3/1998 | Arai et al. | ..................... | 382/202 |
| 5,757,979 A * | 5/1998 | Hongo et al. | ................. | 382/276 |
| 5,841,902 A * | 11/1998 | Tu | ................. | 382/187 |
| 5,930,408 A * | 7/1999 | Seto | ............................. | 382/301 |
| 6,064,767 A * | 5/2000 | Muir et al. | ..................... | 382/190 |
| 6,226,403 B1* | 5/2001 | Parthasarathy | ............... | 382/187 |
| 6,249,606 B1* | 6/2001 | Kiraly et al. | ................. | 382/195 |
| 6,289,124 B1* | 9/2001 | Okamoto | ...................... | 382/187 |
| 6,643,401 B1* | 11/2003 | Kashioka et al. | ............ | 382/197 |
| 6,907,140 B2* | 6/2005 | Matsugu et al. | .............. | 382/195 |
| 7,031,530 B2* | 4/2006 | Driggs et al. | ................ | 382/228 |
| 7,447,360 B2* | 11/2008 | Li et al. | ......................... | 382/186 |
| 7,580,576 B2* | 8/2009 | Wang et al. | ................... | 382/188 |

(Continued)

*Primary Examiner* — Vu Le
*Assistant Examiner* — Aklilu Woldemariam
(74) *Attorney, Agent, or Firm* — Morrison & Foerster LLP

(57) ABSTRACT

Integrating features is disclosed, including: determining a value associated with a temporal feature for a point; determining a value associated with a spatial feature associated with the temporal feature; including the value associated with a spatial feature and the value associated with the temporal feature into a feature vector; and using the feature vector to decode for a character. Determining a transform is also disclosed, including: determining, for a point associated with a sequence of points, a set of points including: the point, a first subset of points of the sequence preceding a sequence position associated with the point, and a second subset of points following the sequence position associated with the point; and determining the transform associated with the point based at least in part on the set of points.

24 Claims, 12 Drawing Sheets

(56) References Cited

U.S. PATENT DOCUMENTS

| | | | |
|---|---|---|---|
| 7,983,478 B2 * | 7/2011 | Liu et al. | 382/161 |
| 2006/0193518 A1 * | 8/2006 | Dong | 382/186 |
| 2007/0050712 A1 * | 3/2007 | Hull et al. | 715/530 |
| 2008/0118143 A1 * | 5/2008 | Gordon et al. | 382/154 |
| 2009/0028435 A1 * | 1/2009 | Wu et al. | 382/190 |

* cited by examiner

INTEGRATING FEATURE EXTRACTION VIA LOCAL SEQUENTIAL EMBEDDING FOR AUTOMATIC HANDWRITING RECOGNITION

CROSS REFERENCE TO OTHER APPLICATIONS

This application claims priority to U.S. Provisional Patent Application No. 61/493,343 entitled INTEGRATING FEATURE EXTRACTION VIA LOCAL SEQUENTIAL EMBEDDING FOR AUTOMATIC HANDWRITING RECOGNITION filed Jun. 3, 2011 which is incorporated herein by reference for all purposes.

BACKGROUND OF THE INVENTION

Automatic handwriting refers to the process of identifying handwritten words or characters in response to an input signal (e.g., character input) from an electronic surface. Sometimes, modern recognition systems cast this process as an instance of information transmission over a noisy channel, which can be described by a statistical framework as the example of FIG. 1. As shown in the example of FIG. 1, W refers to the sequence of words or characters intended to be written (e.g., by a user who inputted the signal on the electronic surface), S to the chirographic realization of that sequence via one or more strokes, and $\hat{W}$ to the hypothesized written sequence output to the user. "Handwriting production" and "handwriting recognition" can be understood as variants of the usual information-theoretic terminology of "encoding" and "decoding." Blocks 102 and 104 are assigned a set of parameters of the form Pr(·|·), symbolizing the instantiation of a stochastic process characterized by a statistical model, for example. These parameters are typically trained from a corpus of exemplars using machine learning techniques, for example. Besides handwriting recognition, the framework of FIG. 1 can also apply to the context of signature verification, gesture recognition and biometric recognition.

An important part of this process is the choice of representation adopted to convey the chirographic evidence S, directly reflecting the type of information extracted from the input signal. Two prominent categories of information include temporal information, which preserves the sequential order in which sample points are captured by the electronic surface, and spatial information, which represents the overall shape of the underlying word or character regardless of how it was produced. Typically, handwriting recognition systems process temporal and spatial information separately, and then combine the respective probability scores from the statistical model for the temporal information and the statistical model for the spatial information. However, combining the separately determined spatial information and temporal information probability scores does not allow for the joint optimization of the two types of information.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
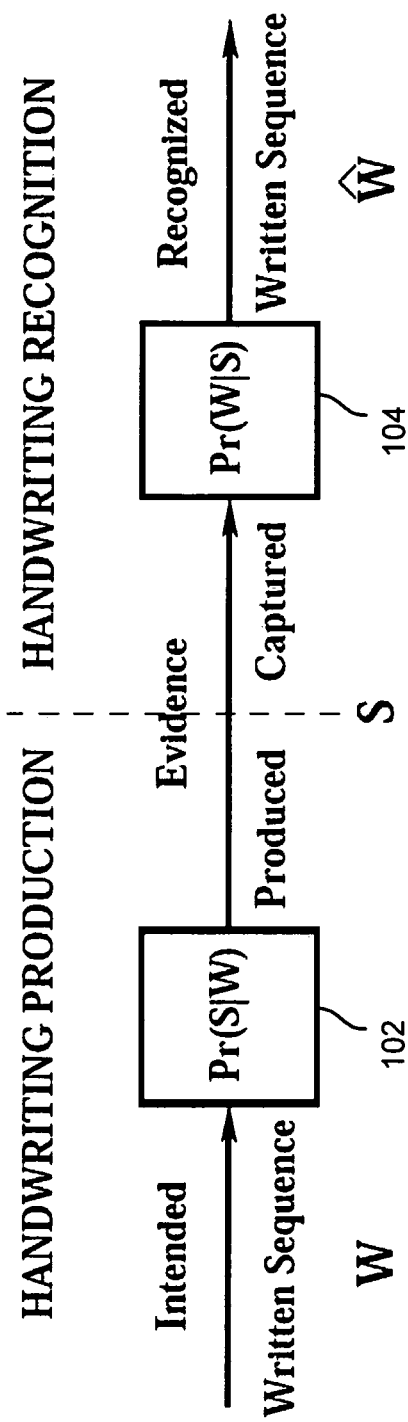
FIG. 1 is a diagram showing an embodiment of a statistical framework for modern recognition systems.
Figure 2:
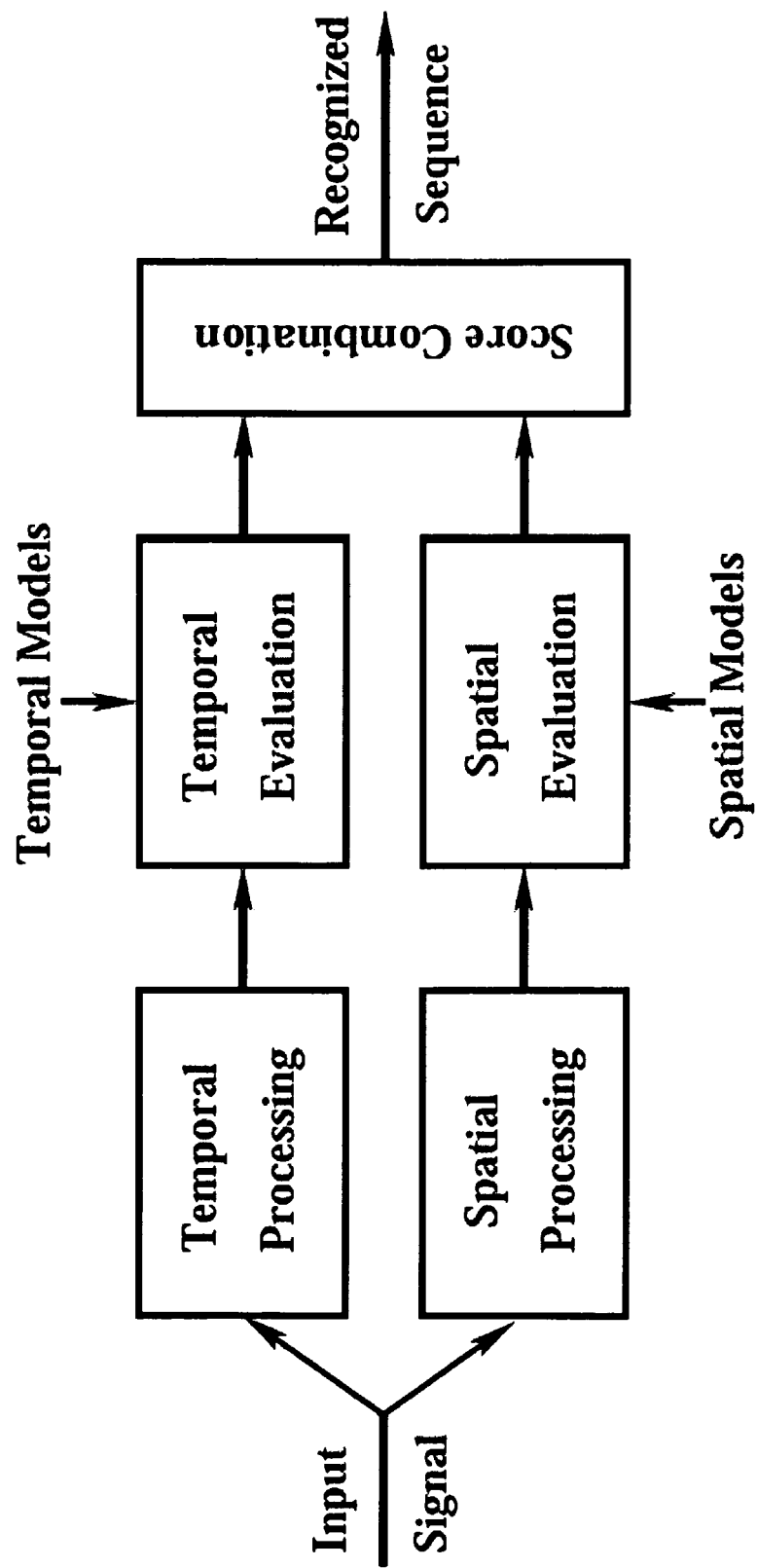
FIG. 2 shows an example of the typical recognition paradigm.

FIG. 2 shows an example of the typical recognition paradigm. The example of FIG. 2 can apply to on-line character recognition because temporal information (e.g., the temporal order or sequence of sampled input data) is considered in addition to static information (e.g., spatial arrangement on a bitmap of the input data) to perform character recognition. Generally, the typical recognition paradigm sets up separate, parallel tracks for the processing of temporal and spatial information. One reason for this parallel set up is that the differences in outlooks for extracting temporal and spatial features generally make it expedient to consider the types of information in this manner. For example, temporal extraction tends to be focused on local phenomena (e.g., direction of the current stroke), whereas spatial extraction inherently is concerned with global characteristics (e.g., several strokes coming together to form a loop).

As illustrated in the example, handwriting recognition systems typically extract and process temporal and spatial information from an input signal separately. Either of the spatial or temporal information processing can also include a modal decomposition (e.g., a transformation) of the respective type of information. An input signal can include a handwritten character produced (e.g., via a human finger or other writing accessory) at an input area (e.g., a trackpad, a touchpad, a touch screen, an electronic writing surface) of a device (e.g., a laptop computer, a desktop computer, a tablet device, a smart phone, or other types of mobile devices). The separately extracted/processed temporal and spatial information are also separately evaluated. For example, the temporal information can be evaluated using one or more statistical models (e.g., Hidden Markov Models) especially trained on the temporal information and the spatial information can be evaluated using one or more statistical models especially trained on the spatial information. The respective probability scores produced by the statistical models are then combined (e.g., using a voting scheme). The combined probability score is used to determine a recognized sequence that can include, for example, one or more likely candidates of characters that are to be identified from the given input signal.

One caveat of the typical recognition paradigm is that spatial and temporal information are evaluated separately and so any complementary aspects of the two types of information can only be leveraged at the score combination level (e.g., in multiple agents or ensembles of classifiers systems). The complementary aspects of the two types of information tend to result in different errors because they are associated with features that are useful in different types of disambiguation. For example, spatial information is useful in disambiguating between a small "o" and a large "O," whereas temporal information in this case is very similar. On the other hand, temporal information is useful in disambiguating between "i" and ":", even if the end characters appear similarly. It would be helpful to reap the benefits of the underlying complementary aspects of temporal and spatial information earlier in the recognition process, as discussed below.

Integrating spatial and temporal feature information to form a single feature vector that is then evaluated in a single evaluation stage is disclosed. In various embodiments, transform operations are performed, for example on a sliding window of sample points, to extract more reliable features to include in a single, integrated feature vector.

Figure 3A:
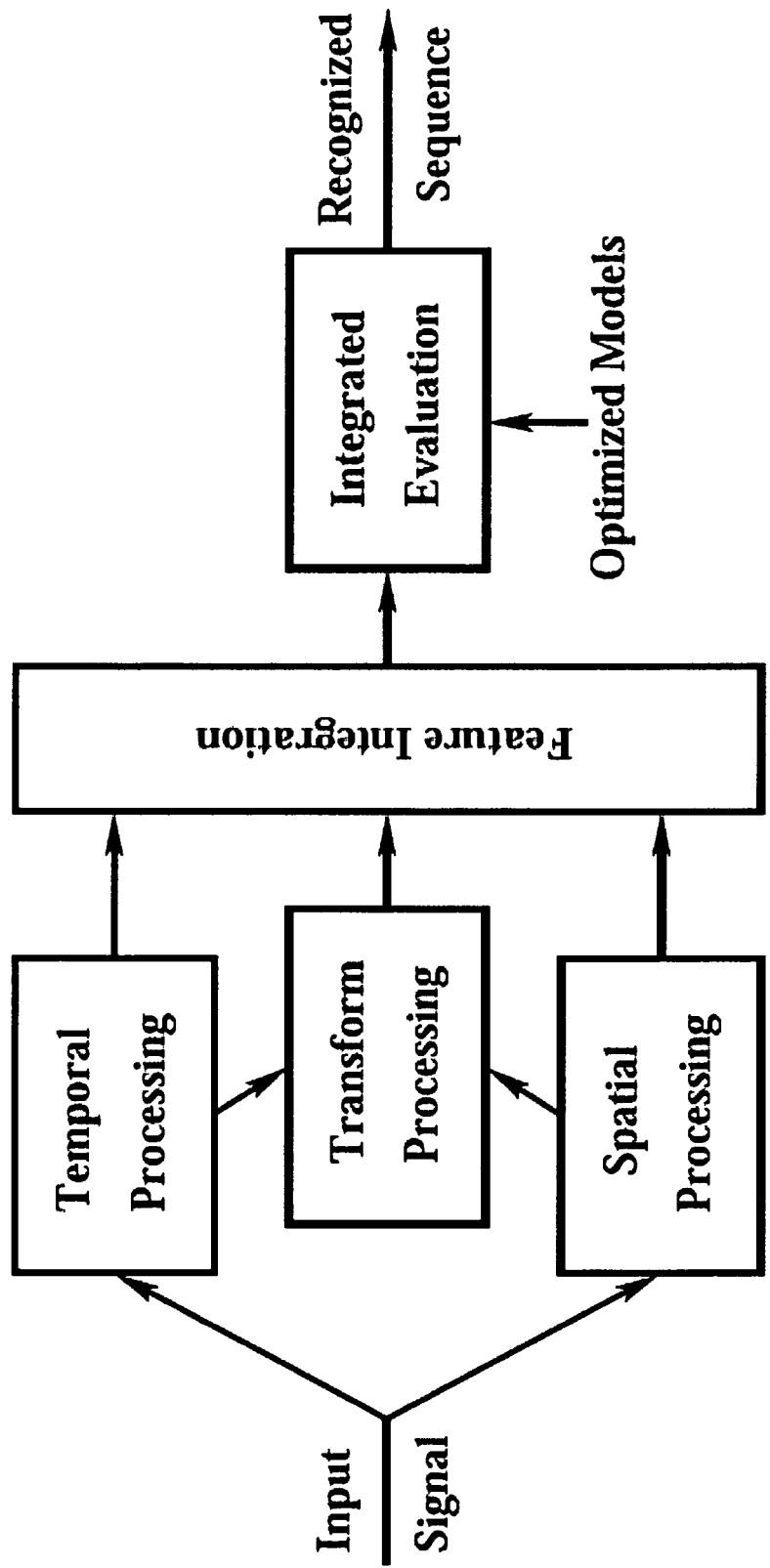
FIG. 3A shows an example of a recognition paradigm that integrates temporal, spatial, and/or transform information at the feature extraction level.

FIG. 3A shows an example of a recognition paradigm that integrates temporal, spatial, and/or transform information at the feature extraction level. The example of FIG. 3 can apply to on-line character recognition because temporal information is considered in addition to static, spatial information to perform character recognition. As shown in the example, temporal, spatial, and temporal and/or spatial transform features are extracted and integrated. The integrated features are then evaluated using one or more statistical models especially trained on the integrated features. Generally, a statistical model is trained on specific features—if the features change, the model needs to be retrained, otherwise the mismatch leads to some degradation in accuracy. So when using integrated features, the statistical models are trained on integrated features in order to fully take advantage of them. The product (e.g., a probability score) from the statistical models are then used to determine a recognized sequence that can include, for example, one or more likely candidates of characters that are to be identified from the given input signal. While in this example, feature integration includes temporal processing transform processing, and spatial processing, in some embodiments, features extracted from any two of these three types of processing may be integrated to generate integrated features (e.g., feature vectors that each include at least two of temporal, spatial, and transform features). For example, features extracted from temporal processing and spatial processing (but not transform processing) may be integrated together.

Figure 3B:
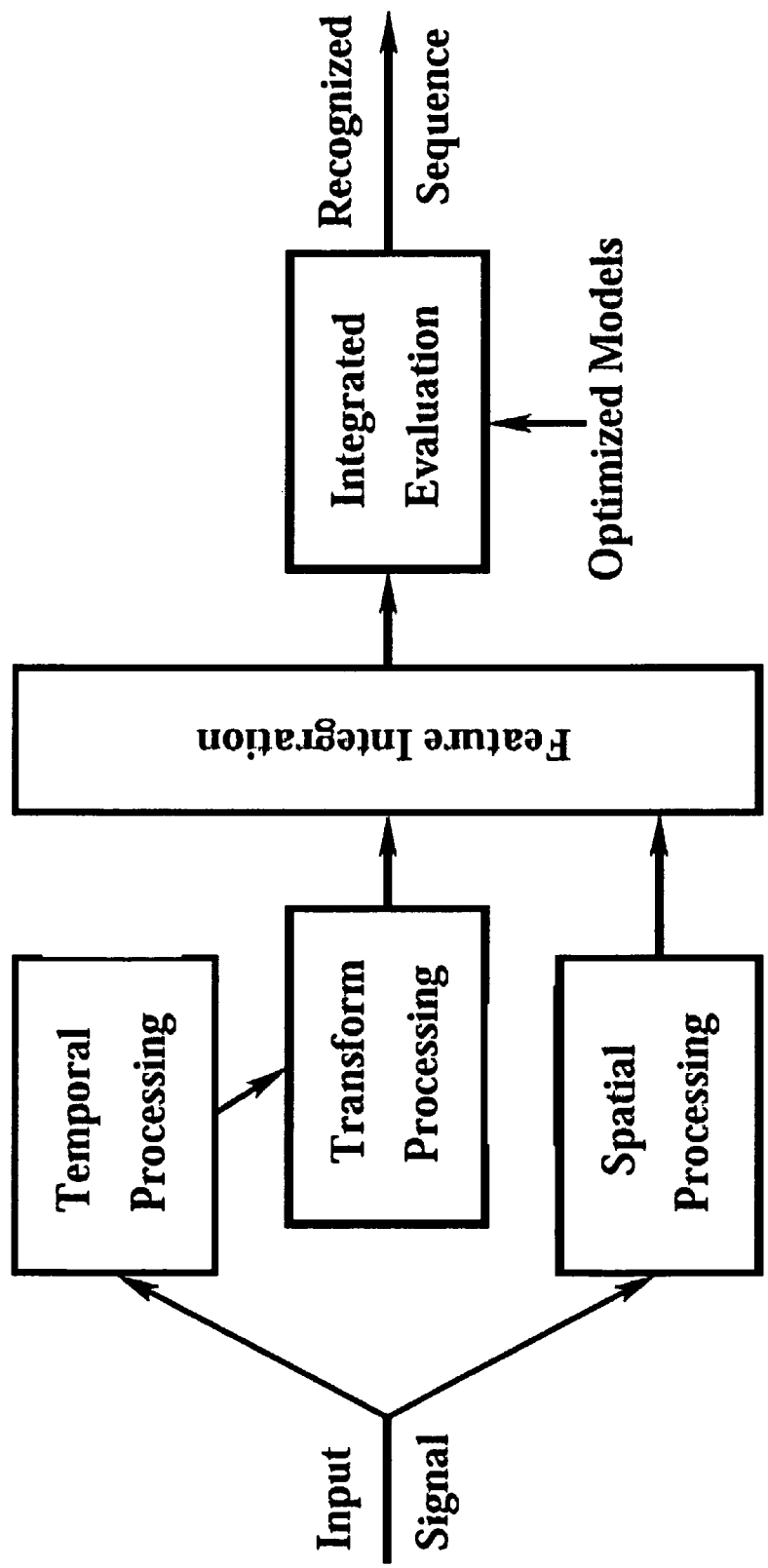
FIG. 3B shows a specific example of a recognition paradigm that integrates spatial and temporal transform information at the feature extraction level.

FIG. 3B shows a specific example of a recognition paradigm that integrates spatial and temporal transform information at the feature extraction level. As mentioned above, in some embodiments any two of three types of processing (e.g., temporal, spatial, and transform) may be integrated to generate integrated features. In this example, extracted spatial features and transform features determined based on extracted temporal features from the input signal are integrated. The integrated features are then evaluated using one or more statistical models especially trained on the integrated features, as described above. In some empirical studies, the integration of spatial features and transform features determined based on temporal features has produced desirable recognition results.

In various embodiments, a transform feature comprises a transform of a sliding window of sample points centered on each point in the sequence of sample points associated with a character input. In various embodiments, temporal, spatial, and temporal and/or spatial transform features are included in a single feature vector. For example, it can be assumed that each sample point in the sequence of sample points to which a character input was mapped is the center the character input. As such, it becomes possible to extract a full complement of temporal, spatial, and/or transform-based features, and append the resulting non-temporal (e.g., transform) information to the usual temporal information extracted at that location. In some embodiments, the process of appending non-temporal (e.g., transform) information to the temporal information extracted at a location (e.g., (x, y) coordinate associated with a sample point) is referred to as local sequential embedding (e.g., because the non-temporal information becomes part of the sequence of dynamic features extracted from the input). In some embodiments, a single feature vector corresponds to features (e.g., temporal, transform, and spatial) extracted for a sample point and/or its local temporal neighborhood of sample points in the sequence of sample points associated with a character input. Through integrating features, spatial and temporal types of information can be used to complement one another, where potentially either spatial or temporal information can fill in missing gaps for the other resulting in the integrated approach disclosed herein yielding more and/or more useful information than evaluating each separately and attempting to combine the results.

Figure 4:
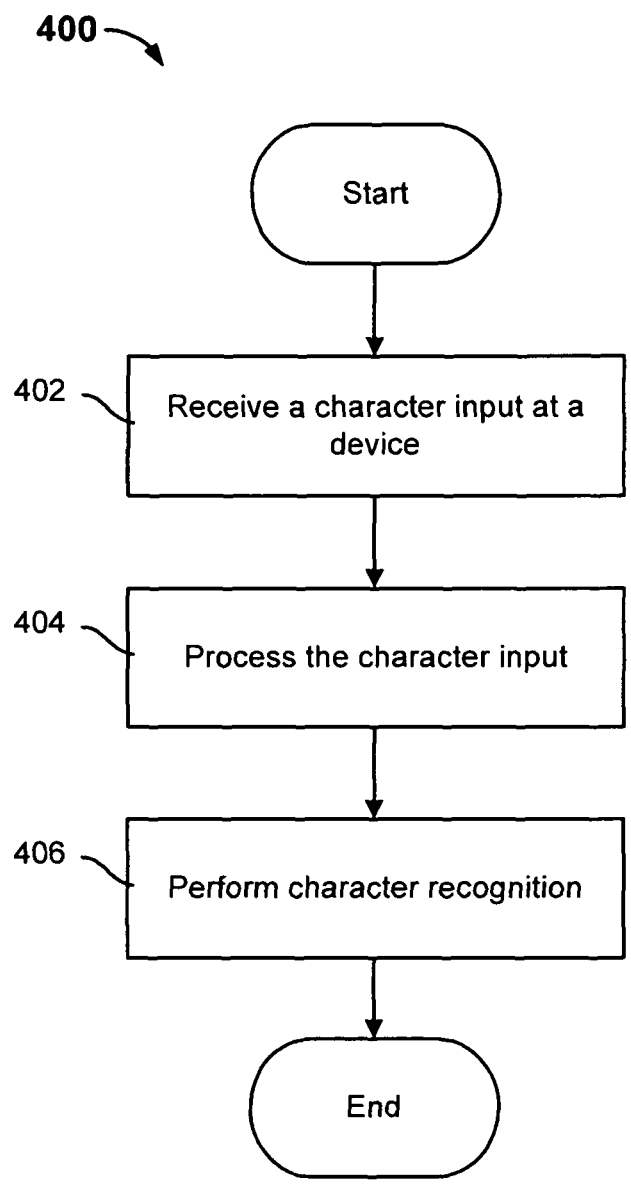
FIG. 4 is a flow diagram showing an embodiment of a process of handwriting recognition.

FIG. 4 is a flow diagram showing an embodiment of a process of handwriting recognition. In some embodiments, process 400 is used to map handwritten characters into encodings of text (e.g., Unicode, GB18030, JIS X 0213, Big5, and/or ASCII). In some embodiments, process 400 is used to implement a recognition technique that integrates temporal, spatial, and transform information at the features extraction level.

In some embodiments, handwriting recognition can be applied to each handwritten stroke (e.g., a character such as a Chinese character can have multiple strokes). In some embodiments, all strokes are completed for a particular character input (e.g., a Chinese character) and then handwriting recognition is applied to the entire, completed character. In some embodiments, multiple characters are written and then each character is analyzed in isolation. The example of process 400 is discussed below with respect to analyzing a completed character input in isolation, although process 400 can be extended and applied to other types of handwriting recognition (e.g., analyzing multiple character inputs together, analyzing each stroke of a character individually). Examples of a character input can include a handwritten production of a Latin character (e.g., "a," "b," "c") or a Chinese character (e.g., "人").

At 402, a character input is received at a device. In some embodiments, the device is configured to include an input area at which a handwritten character can be input and received. Examples of such a device include a laptop computer, desktop computer, tablet device (e.g., Apple's iPad and iPad 2), mobile phone (e.g., Apple's iPhone), and other types of mobile devices. Examples of such an input area include a trackpad (e.g., Apple's Magic Trackpad), an electronic writing surface, a touchpad, and a touch screen (e.g., of a tablet and/or mobile phone device). The input area can be integrated into the device and/or can be a separate accessory that is connected (e.g., via a wire or wireless link) to the device, for example. In various embodiments, the input area is a specialized surface that can receive and capture the motion and position (e.g., and sometimes, pressure and/or temperature) of a writing accessory (e.g., a human finger or stylus) into a sequence of sample points (e.g., using periodic sampling of tracings made by the writing accessory on the input area). In some embodiments, the sequence of sample points include both temporal (e.g., velocity, acceleration, sequence number) and spatial (e.g., a (x, y) coordinate) associations. In some embodiments, the sequence of sample points is used by the device to represent the input character. In some embodiments, a visual representation of the character input is displayed (e.g., at the input area and/or an associated computer monitor) as it is still in production and/or subsequent to its completion.

At 404, the character input is processed. In various embodiments, at least a process of feature extraction is applied at 404. Generally, the purpose of feature extraction is to map input information to a reduced set of information (i.e., features, which can be represented by mathematical vectors) such that the input information can be accurately recognized or classified based on the reduced representation of features. A feature is a variable that is used to represent a characteristic of the input information. Features are selected and defined by designers of a feature extraction process to help decode/classify the input information, distinguish and/or disambiguate the input information, and/or accurately map the input information to the output values. As applied to the present application, the input information for a feature extraction process includes a character input (e.g., as represented by a sequence of sample points) and the output values include text encoding. The technique of determining the value(s) for the defined feature(s) is referred to as feature extraction. The values of the extracted features are placed into one or more vectors, on which decoding (e.g., pattern/handwriting recognition) is performed. Feature extraction could also apply to the analysis of multiple character inputs (e.g., in signature verification). For example, once the whole signature (which could include more than one character input) is completed, feature extraction could be performed on the entire signature (e.g., where features are extracted from one or more of the characters that comprise the entire signature).

In various embodiments, two categories of input information from which features are extracted include temporal information and spatial information. In some embodiments, temporal information preserves the sequential order (e.g., and associated timestamps) in which sample points are captured at the input area. In some embodiments, spatial information represents the overall shape of the underlying character input, regardless of how it was produced. In some embodiments, temporal feature extraction aims to take advantage of the sequential order in which points are captured by the electronic surface, so as to derive information related to the dynamic aspects of the handwriting production. Examples of temporal features include the position, velocity, and acceleration at each sample point. In some embodiments, spatial extraction aims at representing the overall shape of the character input. Examples of spatial features include variations on chain (or stroke) code, sector occupancy, and pixel-level Rutovitz crossing number.

In various embodiments, features are also extracted from transforms of either, both or a combination of temporal and spatial information. For example, a modal decomposition of the handwritten sequence can be computed using one or both of the one-dimensional ("1-D") (temporal) or two-dimensional ("2-D") (spatial) input data. As further described below, a 1-D transform operating over a local temporal neighborhood is disclosed. In various embodiments, at least two of temporal features, spatial features, and transform features based on temporal and/or spatial information (e.g., extracted for a sample point in the sequence) are included in a single feature vector. Also, a set of such feature vectors are evaluated by a set of character recognition models that is optimized for recognizing characters based on temporal features, spatial features, and transform features based on temporal and/or spatial information.

In some embodiments, prior and/or subsequent to feature extraction, one or more of filtering and normalizing can be applied to the character input.

At 406, character recognition is performed on the character input. In various embodiments, the features extracted at 404 (e.g., in the form of feature vectors) are fed into a set of character recognition/decoder/classification models. In some embodiments, the set of character recognition models includes one or both of a character/component model and a language model. In some embodiments, the set of character recognition models includes one or more of the following: a statistical model (e.g., a Hidden Markov Model), a neural network, a support vector machine, and a form of machine learning. In various embodiments, regardless of the specific character recognition models that are used, the set of models has been tailored to the specific features selected/defined for the preceding feature extraction process. Also, the model has been trained with sample inputs to produce the desired outputs (e.g., outputs that have the highest probability of matching or correlating with the given input(s)). In various embodiments, the set of character recognition models is implemented using a combination of software and hardware across one or more devices.

For example, if the features selected for the feature extraction process included two temporal features of position and velocity, two spatial features of chain strokes and sector occupancy, and three transform features derived from temporal information, then the character recognition model to be used is tailored for those seven features.

In various embodiments, the output of a character recognition process for a piece of given input information that is a character input is an encoded text character. In some embodiments, text encoding schemes include Unicode, ASCII, GB18030, JIS X 0213, Big5, HKSCS and or other appropriate encodings. In some embodiments, the output encoded text character is the encoded text character that the character recognition model has determined to have the highest probability to map to and/or have the strongest correlation to the input, handwritten character. In various embodiments, the output of character recognition for a piece of given input information of an input character is more than one encoded text characters, which the character recognition model has determined to have the highest probabilities (over other possible output characters) to map to and/or have the strongest correlations to the input, handwritten character. In some embodiments, the one or more output encoded text characters are displayed (e.g., for a user to select among) and/or submitted to a word processing software application.

Figure 5B:
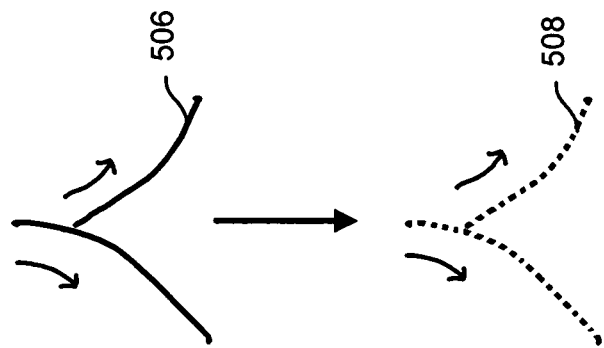
FIG. 5B is an example of a handwritten input of the Chinese character "人" (pronounced "ren" and means "person" or "people" in English).
Figure 5A:
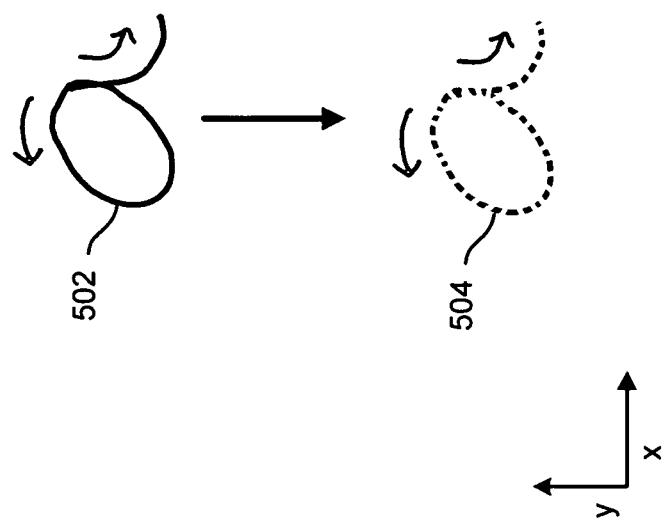
FIG. 5A is an example of a handwritten input of the Latin character "a."

FIGS. 5A and 5B are examples of characters that are input into an input area of a device configured to receive character inputs. In some embodiments, handwritten productions (e.g., 502 and 506) can be received by a device using 402 of process 400.

FIG. 5A is an example of a handwritten input of the Latin character "a." Assume that handwritten production 502 was intended to be the lower case Latin character "a" (i.e., accurate character recognition of handwritten production 502 could map it to the encoded character of "a" in some text encoding scheme). Handwritten production 502 could have been written into an input area of a device by a user of the device. The user could have used his/her finger and/or a writing accessory (e.g., stylus) to produce handwritten production 502 by tracing along the surface of the input area in the outline of handwritten production 502. In this example, handwritten production 502 was created using one continuous stroke, meaning that the user created handwritten production 502 without lifting the finger/writing accessory off the input area. While handwritten production 502 appears as continuous lines, it is received by the device via periodic sampling. In this example, sequence of sample points 504 is the form in which the device is configured to receive handwritten production 502. Each sample point of sequence of sample points 504 can be associated with a two-dimensional coordinate (e.g., (x, y) coordinate) and/or a time element (e.g., a sequence number and/or timestamp) that indicates its production time relative to the other sample points. In some embodiments, a sample point can also be mapped to at least one filled in pixel on a bitmap. For example, the mapping of one (x, y) sample point can be to N pixels. The mapping of a sample point to a certain number of pixels can depend on the number of sample points in a sequence (e.g., as determined by the size of the handwriting production) and the size of the bitmap to which the sequence is mapped. For example, if a large bitmap (e.g., 10,000 by 10,000) is chosen, then the bitmap would be sparse if one sample point were mapped to only one pixel. In this scenario, lines (of pixels) can be drawn between the mapped to pixels, which would result in one sample point being mapped to more than one pixel. On the other hand, if the grid were small (e.g., 10 by 10), then several sample points could be mapped to one pixel (e.g., as a way of "compressing" the sampled data). In various embodiments, a pixel refers to a single point in a bitmap, the smallest addressable screen element in a display device or the smallest unit of an image that can be represented or controlled. While a pixel is shown as rectangle (e.g., a square) in the figures, the representation of a pixel is not limited to only a rectangle. While the sample points of sequence of sample points 504 in the example are shown to be relatively evenly spaced apart, there could be clusters of adjacent sample points that appear closer together or farther apart, depending on how quickly a stroke (or a portion thereof) was produced/inputted in the input area. For example, sampling of a handwriting production could be performed at a constant rate. As a result, sample points that are closer together map to a slower hand movement along the surface of the input area and sample points that are farther apart map to a faster hand movement along the surface of the input area. In various embodiments, a transform of a sliding window of points to frequency domain captures this dynamism over a nearby sequence of points where raw velocity or acceleration viewed from one point may not. A transform enables the capture of this dynamic information (e.g., temporal neighborhood of points) into a manageable number of values.

FIG. 5B is an example of a handwritten input of the Chinese character "人" (pronounced "ren" and means "person" or "people" in English). Assume that handwritten production 506 was intended to be the Chinese character of "人" (i.e., accurate character recognition of handwritten production 506 could map it to the encoded character of "人" in some text encoding scheme). Handwritten production 506 could have been produced in a manner similar to handwritten production 502 (e.g., written to an input area by a writing finger/accessory). However, unlike handwritten production 502, in this example, handwritten production 506 was produced by two strokes; the first stroke originated from the top of the character and veered left on the page and was created before the creation of the second stroke that originated from the top of the character and veered right on the page. Similar to handwritten production 502, handwritten production 506 is also received by the device as a sequence of sample points, such as sequence of sample points 508. Each sample point of sequence of sample points 508 can have similar properties to a sample point of sequence of sample points 504 (e.g., be associated with a (x, y) coordinate and a sequence number).

Figure 6:
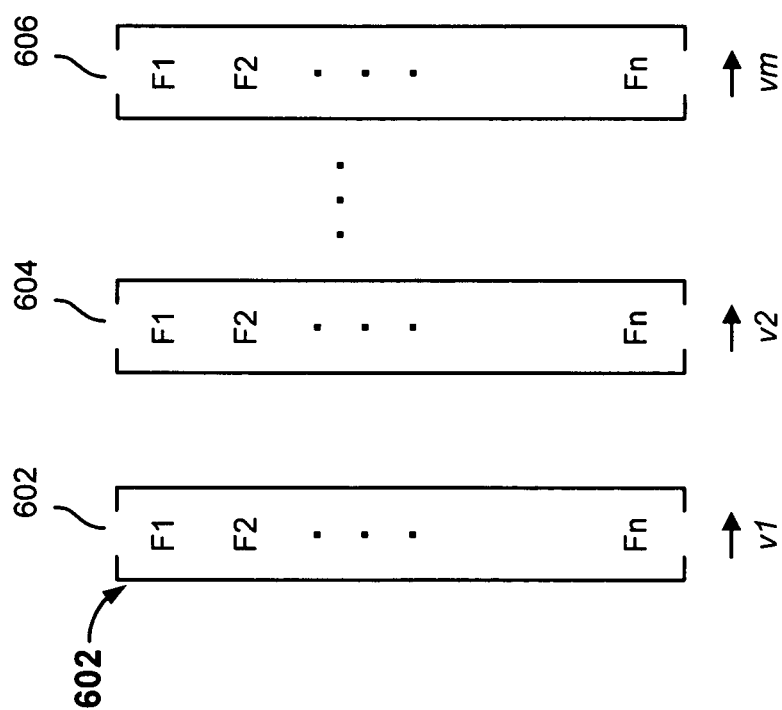
FIG. 6 is a diagram showing an example of feature vectors.

FIG. 6 is a diagram showing an example of feature vectors. In various embodiments, feature extraction (such as the process applied in 404 of process 400) maps various characteristics (i.e., features) of a character input into a set of values. In some embodiments, features are extracted for one or more sample points of the sequence of sample points derived from a character input (as opposed to the entire sequence of sample points) and the values corresponding to the extracted features are placed into a feature vector associated with those one or more sample points. In this example, feature vector $v_1$ 602 is associated with one or more sample points of a character input received at an input area of a device. Feature vector $v_1$ 602 includes values corresponding to extracted features $F_1$, $F_2$, through $F_n$ associated with those one or more sample points. Similarly, feature vector $v_2$ 604 is associated with another one or more sample points (which may include at least some sample points from which features were extracted for feature vector $v_1$ 602) and includes values corresponding to extracted features $F_1$, $F_2$, through $F_n$ associated with those one or more sample points, and so forth. In some embodiments, features extracted to be included in a feature vector include temporal features and/or spatial features and/or a combination/transform of temporal and/or spatial features. In this example, the set of feature vectors $v_1$, $v_2$, through $v_m$ form a matrix of values (which is of n-by-m dimensions in this example), which, in some embodiments may also be referred to as a feature space. In some embodiments, the feature space may be generated from the sequence of sample points derived from the character input to represent the character input. For example, the feature space that represents a character input may include 100 to 200 feature vectors. The feature space can be fed into a set of character recognition models to determine one or more encoded text characters that correspond to the character input. The set of character recognition models to which the feature space is fed is trained on the specific integrated features (e.g., spatial features, temporal features, and/or transform features) included in the feature space. In some embodiments, the feature space can be reduced in at least one dimension through a manual or automatic selection (e.g., using matrix multiplication) of a subset of values of the feature space (e.g., the values selected are presumed to include more helpful information to assist in the recognition process) before it is fed to the set of character recognition models.

Figure 7:
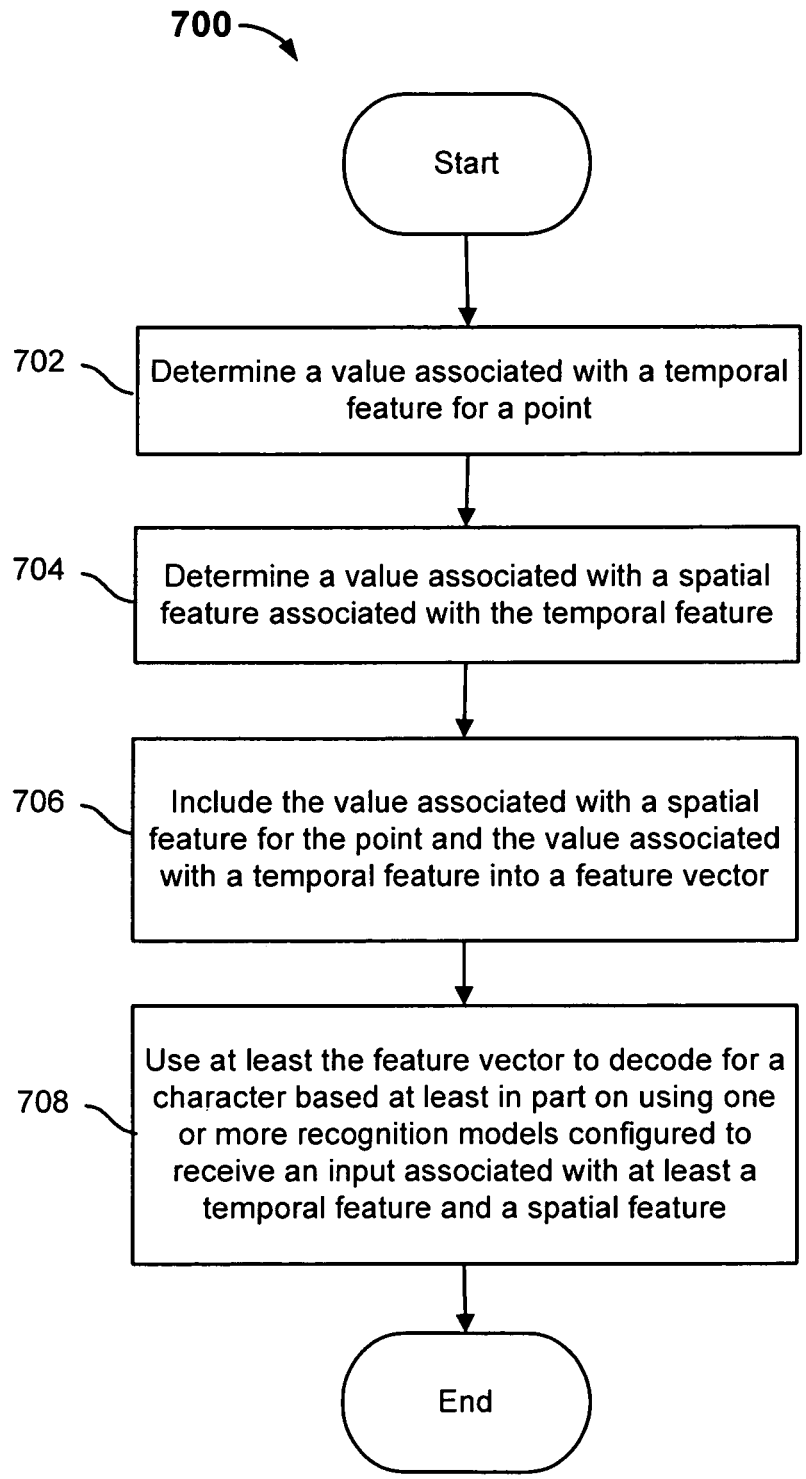
FIG. 7 is a flow diagram showing an embodiment of a process for integrative feature extraction.

FIG. 7 is a flow diagram showing an embodiment of a process for integrative feature extraction. In some embodiments, process 700 can be used to implement, at least in part, 404 and 406 of process 400.

At 702, a value associated with a temporal feature for a point is determined. In various embodiments, each point is associated with at least a spatial component (e.g., a (x, y) coordinate) and a temporal component (e.g., a global sequence number that indicates the point's order in the sequence relative to all other point associated with the same character input). In some embodiments, each sample point in a sequence of sample points that is derived from a character input is mapped to at least one pixel on a bitmap (e.g., a sequence of sample points is mapped to a set of pixels on a bitmap). As shown in the figures of the present application, a pixel to which a sample point is mapped is represented by a filled in (e.g., black) pixel. In some embodiments, a temporal feature associated with one or more points may include the position (x, y), velocity (dx/dt, dy/dt), and acceleration ($d^2x/dt$, $d^2y/dt$), and any other appropriate feature that can be derived from temporal information.

At 704, a value associated with a spatial feature associated with the temporal feature is determined. In various embodiments, a spatial feature value is determined based at least in part on the temporal feature value and the related spatial and temporal values are to be included in the same feature vector. For example, the value associated with the spatial feature may be determined using at least the point from which the temporal feature value was determined. In another example, the value associated with the spatial feature may be determined using not the point or not only the point from which the temporal feature was determined but other points within a neighborhood of that point. The neighborhood may be temporal (e.g., sample point(s) that precede or follow the point in the sequence of sample points) or spatial (e.g., sample point(s) that map to pixels within a certain vicinity on a bitmap relative to the point) in nature. In some embodiments, a spatial feature associated with one or more points can include variations on chain (or stroke) codes, sector occupancy, pixel-Rutovitz crossing number, and any other appropriate feature that can be derived from spatial information.

At 706, the value associated with a spatial feature for the point and the value associated with a temporal feature are included in a feature vector. In some embodiments, including the values into a feature vector includes appending the values into respective positions within a mathematical vector. In some embodiments, the mathematical vector is of n-by-one dimensions (or one-by-n dimensions) where n is the total number of features to be included in the vector).

At 708, at least the feature vector is used to decode for a character based at least in part on using one or more recognition models configured to receive an input associated with at least a temporal feature and a spatial feature. A set of one or more character recognition models is trained on the specific features included in one or more feature vectors. In some embodiments, the one or more recognition models is specifically trained to receive an input (e.g., one or more feature vectors) associated with at least one temporal feature and one spatial feature. For example, the one or more recognition models are specifically trained to receive an input associated with at least one temporal feature and one spatial feature and to produce one or more outputs from which to determine one or more recognized characters. This is as opposed to the conventional approach of using recognition models trained on only spatial features and other recognition models trained on only temporal features to produce two outputs (e.g., probability scores), which are then combined to produce a combined output. And then, the combined output is used to determine one or more recognized characters.

In some embodiments, a value associated with a transform based on either or both of temporal and spatial information is determined and also included in the feature vector. In the event that the value associated with a transform is determined and included in the feature vector, the one or more recognition models are configured to (e.g., trained to) receive an input associated with at least a temporal feature, a spatial feature and a transform based on either or both of temporal and spatial information. In some embodiments, a transform feature is determined over a local temporal neighborhood of the point. For example, a 1-D Discrete Cosine Transform (DCT) can be computed for a point using a window centered on the point and including some of its temporal neighbor points and the first 4 DCT coefficients can be used as transform features for that point.

Figure 8:
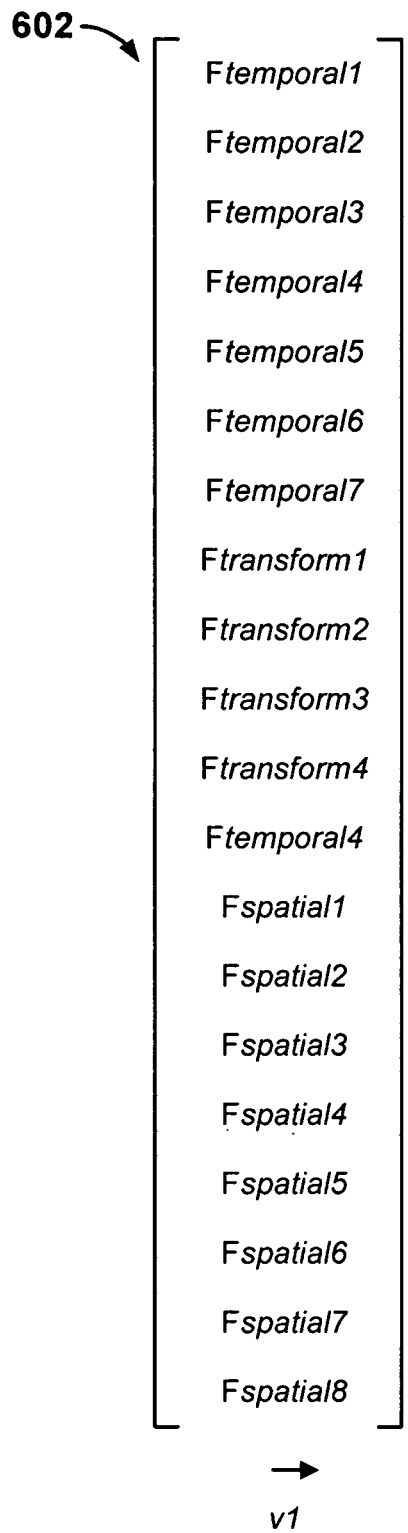
FIG. 8 shows an example of a feature vector that includes integrated features.

FIG. 8 shows an example of a feature vector that includes integrated features. In some embodiments, the example of FIG. 8 can be used to implement feature vector 602 of FIG. 6. In this example, the feature vector includes 19 features and is of the dimension 19-by-1. In this example, the feature vector includes 19 determined values that correspond to 7 temporal features associated with one or more points (e.g., sample points derived from a character input), 4 transform features associated with at least some of the one or more points, and 8 spatial features associated with at least some of the one or more points. In this example, the 7 temporal features include at least two versions of (x, y) (one version is with and the other version is without normalization by the maximum horizontal and vertical excursions), the sine and cosine of the local tangent at the one or more points, and an approximate measure of the incremental aspect ratio of the input (e.g., the distance from the coordinate of the pixel to a selected reference point). In this example, the 4 transform features include the first 4 DCT coefficients of a 1-D DCT transform operating over a local temporal neighborhood (e.g., included in a window of a fixed size) of the one or more points. In this example, the 8 spatial features include any appropriate 8 spatial features such as a Rutovitz crossing number, a tiling of the imaged based on the one or more points, variations on chain (or stroke) codes, sector occupancy, for example.

Figure 9:
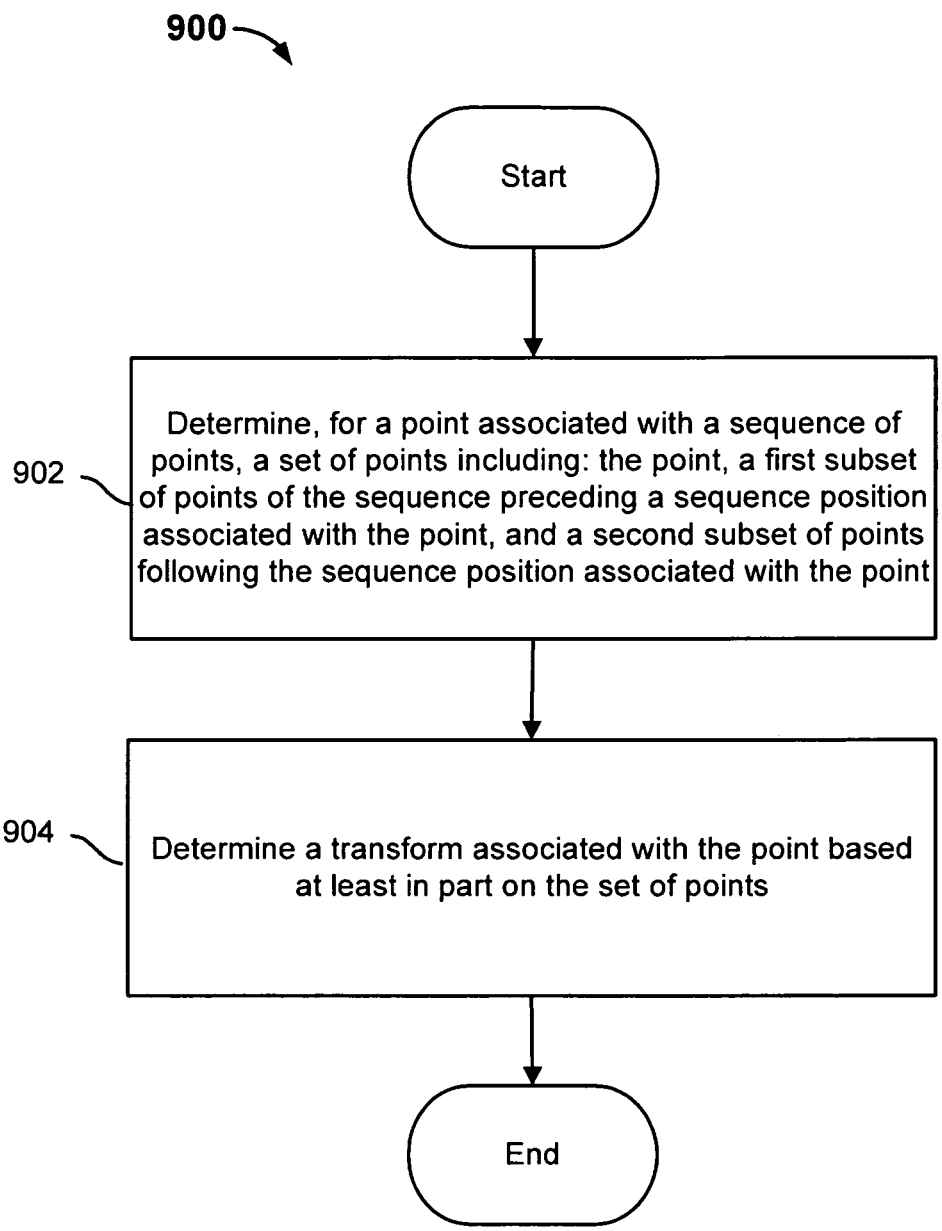
FIG. 9 is a flow diagram showing an embodiment of a process of applying a process of local sequential embedding for a point.

FIG. 9 is a flow diagram showing an embodiment of a process of applying a process of local sequential embedding for a point. In some embodiments, process 900 is implemented at a part of 404 of process 900. One goal of process 900 is to combine dynamic (e.g., temporal) and static (e.g., spatial) information that are related to the same sample point.

At 902, for a point associated with a sequence of points, a set of points including: the point, a first subset of points of the sequence preceding a sequence position associated with the point, and a second subset of points following the sequence position associated with the point is determined. At 904, a transform associated with the point is determined based at least in part on the set of points. For example, each point is associated with at least one temporal component which is, for example, a global sequence position in the sequence of sample points derived from the character input. Taking a certain point under consideration (e.g., in performing feature extraction for that particular point), a sliding window can be centered on the point to include points in its local temporal neighborhood (e.g., points whose associated sequence positions are within a defined range of the point's own sequence position). Then, a transform (e.g., 1-D DCT, Haar wavelets, or Fourier descriptors) can be computed for the point under consideration using the points included in the window centered on the point under consideration. The resulting first 4 transform (e.g., 1-D DCT, Haar wavelets, or Fourier descriptors) coefficients (e.g., which are presumed to include the highest energies) can be used as transform feature values for the point under consideration. These 4 transform features can be included in one or more feature vectors corresponding to the point under consideration, where the feature vector(s) can include other spatial and/or temporal features associated with that point. In some embodiments, the window can be slid to center on each of at least some of the points in the sequence to compute a transform (e.g., 1-D DCT, Haar wavelets, or Fourier descriptors) for that point.

In this example, the 1-D DCT may be used as the transform operating on the local temporal neighborhood of points for a point under consideration. DCT transforms are often used in image processing, for example, to enable easier classification of different characteristics. The DCT utilizes the fact that the information content of an individual point is relatively small and that, to a large extent, spatial contribution of a point can be predicted using its neighbors. An advantage of the DCT transform is the removal of redundant information between neighboring points such that the more distinctive information is captured by the transformation. In application to automatic handwriting recognition, the DCT can help describe different shapes of portions of the handwritten character input. The DCT transformation also has the property of compacting energy into as few coefficients as possible, which is why the first few (e.g., 4) coefficients of the 1-D DCT transform are selected to be the transform features. For example, the coefficients of the 1-DCT capture the "levels" of the waves associated with the transform of the values into the frequency domain. In some embodiments, the size of the sliding window is fixed (e.g., determined prior to performing feature extraction). The size of the window includes the point and a certain amount of points that sequentially precede and follow the point. A principle behind picking a window size is the desire to include enough sequentially neighboring points such that a spatial pattern (e.g., a corner, a loop, a hook) of the character input can be discerned using the transformation. For example, the window can include 4 or 8 points on either side of the sequence position associated with the point under consideration (e.g., the center point). Performing a 1-D DCT transform on sequentially neighboring points (e.g., whose globally computed spatial information can be retrieved from cache) generates more transform-based information for a point under consideration, which can be concatenated into a feature vector associated with that point, along with temporal and spatial features.

Figure 10:
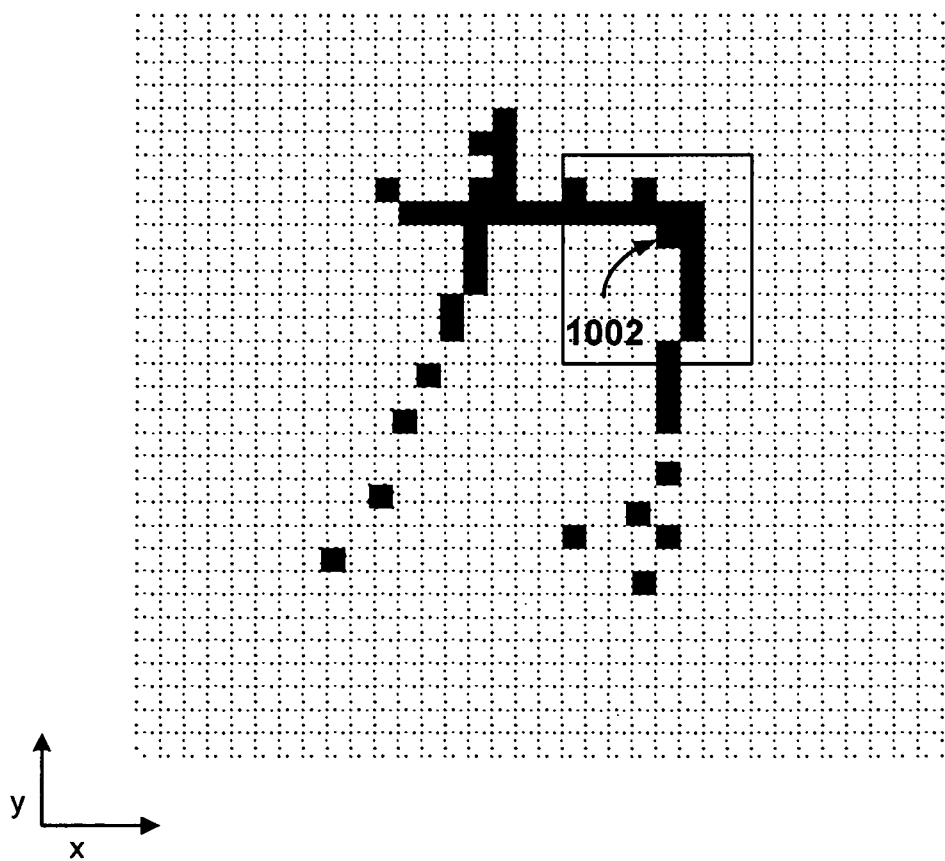
FIG. 10 shows an example of a bitmap with a set of pixels derived from a sequence of sample points of a character input on which local sequential embedding is applied.

FIG. 10 shows an example of a bitmap with a set of pixels derived from a sequence of sample points of a character input on which local sequential embedding is applied. The example of FIG. 10 shows a character input that was intended to be identified as the Chinese character "力" (pronounced "li" and means "energy" or "strength" in English). In various embodiments, a handwritten character input was received at an input area of a device as a sequence of sample points. In some embodiments, the spatial information of the sample points is mapped to a set of pixels on a bitmap. A pixel to which a sample point is mapped is shown as filled in (black) in the example. Each pixel is associated with a rectangle and/or a (x, y) coordinate on the bitmap (which may or may not be the same coordinate of the sample point from which it was mapped). The temporal information (e.g., sequence positions) of the sample points are stored but not shown at this example. To compute the local sequential embedding of the points, a local temporal neighborhood is defined by centering a sliding window on a current point (e.g., associated with a sample point) under consideration and subsequently, computing a transformation (e.g., a 1-D DCT) on the points included within the window. In some embodiments, the sliding window is centered on each of the sample points of the sequence. In this example, the sliding window is shown to be centered on point 1002. An example of computing the 1-D DCT transform for the local temporal neighborhood of point 1002 is discussed below.

Figure 11:
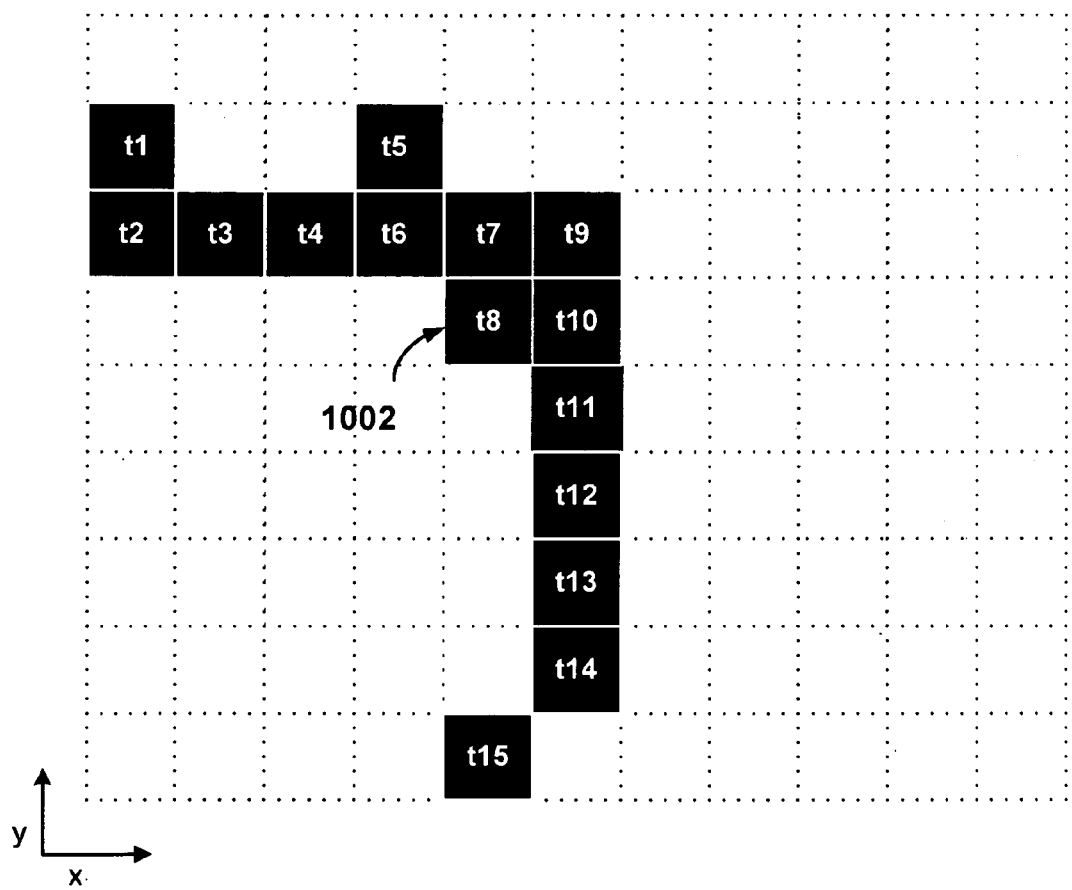
FIG. 11 shows an example of a close up on a sliding window over a local temporal neighborhood of a point under consideration.

FIG. 11 shows an example of a close up on a sliding window over a local temporal neighborhood of a point under consideration. In some embodiments, FIG. 11 is a close-up of the spatial area within the sliding window over the local temporal neighborhood of point 1002. As shown in the example, the relative sequence positions of the points within the window are denoted by the labels of t1 through t15. The relative sequence positions of the points within this window can be derived from the global sequence positions of the points within the entire set of points. The window of this example includes 7 points (t1, t2, t3, t4, t5, t6, and t7) that precede point 1002 (whose relative sequence position is t8) and 7 points that follow point 1002 (t9, t10, t11, t12, t13, t14, and t15). Each of the points within the window is associated with (e.g., cached) spatial information such as, for example, a (x, y) coordinate. A 1-D DCT transform could be performed over the 15 points within the window, where, for example, the function over which the transform is operated is based at least on the (x, y) coordinates of each of the points within the window.

For example, a common DCT of a 1-D sequence of length N is as follows:

$$C(u) = \propto (u) \sum_{t=0}^{N-1} f(t) \cos\left[\frac{\pi(2t+1)u}{2N}\right] \quad (1)$$

In formula (1), u (=0, 1, 2, ..., N-1) represents the coefficients of the 1-D DCT, $$\propto (u) = \begin{cases} \sqrt{\frac{1}{N}} & \text{for } u = 0 \\ \sqrt{\frac{2}{N}} & \text{for } u \neq 0 \end{cases},$$

and f(t) represents a function of time over which the transform is performed. As applied to this example of FIG. 11, f(t) could be a function representative of the (x, y) coordinates of the points included in each sliding window.

For example, assume that a sample point sequence over which a 1-D DCT transform is to operate is (in (x, y) coordinate form) (32, 84), (37, 79), (43, 60), (44, 63), (45, 64), and (50, 70). Assume that a 5-point window is centered on point (43, 60), the coordinates of points in the x-direction (32, 37, 43, 44, 45) corresponding to the 5-point window centered around (43, 60) are considered. Similarly, in the y-direction, (84, 79, 60, 63, 64) are considered. As such, these 2 separate x and y trajectories represent the movement of the stroke in the x-direction as well as the stroke in the y-direction. In this example, a 1-D DCT can be taken in each of the x and y directions. Then, the first N DCT coefficients from the x-direction and the first N DCT coefficients from the y-direction can be taken as features. This will yield a vector of size (M+N). In this example, assume that M=2 and N=2 and hence 4-dimensional vector is created. The size of this window is merely chosen for exemplary purposes and the actual size of the window (e.g., over which a transform is to operate) can be tuned to the appropriate context. More detailed gestures/handwriting recognition applications may require a larger window. Similarly, the sampling rate of the device may also factor in to the size of window chosen. Each individual 1-D DCTs in the x and y directions model the trajectory of the stroke around that local neighborhood.

The 1-D DCT transform produces a series of coefficients. The first 4 of these coefficients (e.g., u=0, 1, 2, and 3, the coefficients with the four highest energies) can be considered as transform features and appended to the temporal features and/or spatial features extracted in association with point 1002 in a single feature vector (e.g., feature vector 602) corresponding to at least point 1002. Performing a 1-D DCT over the points included in the window center on point 1002 (and its neighboring points), makes it more likely an automated evaluation process would discern that an angle/corner is present in this local temporal neighborhood of points, which can ultimately be used to recognize the underlying character. A 1-D DCT, like any transform, is merely a different representation of the input data. Using a transform on at least a portion of a handwriting sample could denote that a lot of action (e.g., content associated with the sample) is located at a certain frequency. Using only spatial information as a bitmap, the global characteristics of the handwriting sample could be discerned (e.g., a written "O" would appear as such on a bitmap). However, using a transform over at least a portion of the sample, a classification of at least a portion of the sample can be identified (e.g., the "O" could be classified as a "circle"). The transform of input data can be used to define features that generalize across various users (with their varying styles of handwriting production) to more accurately classify the characteristics of the input data.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for integrating features, comprising:
   a processor configured to:
   determine a value associated with a temporal feature for a point associated with a sequence of points;
   determine a value associated with a spatial feature for the point, computed from a set of points including: the point, a first subset of points of the sequence preceding a sequence position associated with the point, and a second subset of points following the sequence position associated with the point;
   include the value associated with the spatial feature and the value associated with the temporal feature in a single feature vector having both values; and
   use at least the feature vector to decode for a character based at least in part on using one or more integrated recognition models configured to receive an input associated with at least a temporal feature and a spatial feature; and
   a memory coupled to the processor and configured to provide the processor with instructions.

2. The system of claim 1, wherein the point comprises a sample point included in the sequence of points, and the sequence of points is derived from a handwriting input.

3. The system of claim 1, wherein the point comprises a pixel.

4. The system of claim 1, wherein the point is associated with a (x,y) coordinate.

5. The system of claim 1, wherein the value associated with the temporal feature is associated with at least a temporal or spatial neighborhood of points associated with the point.

6. The system of claim 1, wherein the one or more integrated recognition models are trained on an integration of spatial information and temporal information.

7. The system of claim 1, wherein the spatial feature may include one or more of the following: chain or stroke code, sector occupancy, and pixel-level Rutovitz crossing number.

8. The system of claim 1, wherein the temporal feature may include one or more of the following: position, velocity, and acceleration.

9. A method for integrating features, comprising:
   at an electronic device having a processor and memory:
   determining a value associated with a temporal feature for a point associated with a sequence of points;
   determining a value associated with a spatial feature for the point, computed from a set of points including: the point, a first subset of points of the sequence preceding a sequence position associated with the point, and a second subset of points following the sequence position associated with the point;
   including the value associated with the spatial feature and the value associated with the temporal feature in a single feature vector having both values; and
   using at least the feature vector to decode for a character based at least in part on using one or more integrated recognition models configured to receive an input associated with at least a temporal feature and a spatial feature.

10. The method of claim 9, wherein the point comprises a sample point included in the sequence of points, and the sequence of points is derived from a handwriting input.

11. The method of claim 9, wherein the value associated with the temporal feature is associated with at least a temporal or spatial neighborhood of points associated with the point.

12. The method of claim 9, wherein the one or more integrated recognition models are trained on an integration of spatial information and temporal information.

13. A computer program product for integrating features, the computer program product being embodied in a non-transitory computer readable medium and comprising computer instructions for:
   determining a value associated with a temporal feature for a point associated with a sequence of points;
   determining a value associated with a spatial feature for the point, computed from a set of points including: the point, a first subset of points of the sequence preceding a sequence position associated with the point, and a second subset of points following the sequence position associated with the point;

including the value associated with the spatial feature and the value associated with the temporal feature in a single feature vector having both values; and using at least the feature vector to decode for a character based at least in part on using one or more integrated recognition models configured to receive an input associated with at least a temporal feature and a spatial feature.

14. A system of determining a transform, comprising:

a processor configured to:

determine, for a point associated with a sequence of points, a set of points including:

the point, a first subset of points of the sequence preceding a sequence position associated with the point, and a second subset of points following the sequence position associated with the point;

determine the transform associated with the point based at least in part on the set of points;

include a value determined from the transform in a single feature vector including values corresponding to one or more of a spatial feature and a temporal feature associated with the point; and use the feature vector to decode for a character using an integrated recognition model; and a memory coupled to the processor and configured to provide the processor with instructions.

15. The system of claim 14, wherein the transform comprises a 1-dimensional discrete cosine transform.

16. The system of claim 14, wherein the transform comprises a Haar wavelets-based transform.

17. The system of claim 14, wherein the transform comprises a Fourier descriptor-based transform.

18. The system of claim 14, wherein the first subset of points comprises a same number of points as the second subset of points.

19. The system of claim 14, wherein the set of points is included within a sliding window associated with a size comprising a number of points present within the set of points.

20. The system of claim 14, wherein the point comprises a pixel.

21. A method of determining a transform, comprising:

at an electronic device having a processor and memory:

determining, for a point associated with a sequence of points, a set of points including: the point, a first subset of points of the sequence preceding a sequence position associated with the point, and a second subset of points following the sequence position associated with the point;

determining the transform associated with the point based at least in part on the set of points;

including a value determined from the transform in a single feature vector including values corresponding to one or more of a spatial feature and a temporal feature associated with the point; and using the feature vector to decode for a character using an integrated recognition model.

22. The method of claim 21, wherein the first subset of points comprises a same number of points as the second subset of points.

23. The method of claim 21, wherein the set of points is included within a sliding window associated with a size comprising a number of points present within the set of points.

24. A computer program product for determining a transform, the computer program product being embodied in a non-transitory computer readable medium and comprising computer instructions for:

determining, for a point associated with a sequence of points, a set of points including: the point, a first subset of points of the sequence preceding a sequence position associated with the point, and a second subset of points following the sequence position associated with the point;

determining the transform associated with the point based at least in part on the set of points;

including a value determined from the transform in a single feature vector including values corresponding to one or more of a spatial feature and a temporal feature associated with the point; and using the feature vector to decode for a character using an integrated recognition model.

* * * * *